United States Patent [19]

Hammer et al.

[11] Patent Number: 4,916,344
[45] Date of Patent: Apr. 10, 1990

[54] MOTOR MAGNET SHIELD RETENTION ASSEMBLY

[75] Inventors: Joe K. Hammer, Bowling Green; Alan H. Fitzsimmons; Hans Greutmann, both of Toledo, all of Ohio

[73] Assignee: Prestolite Electric Incorporated, Toledo, Ohio

[21] Appl. No.: 285,091

[22] Filed: Dec. 15, 1988

[51] Int. Cl.⁴ .................... H02K 15/14; H02K 21/26; H01F 7/02
[52] U.S. Cl. ................................. 310/154; 310/91; 29/596
[58] Field of Search ............... 310/42, 89, 154, 156, 310/91, 254

[56] References Cited
U.S. PATENT DOCUMENTS 4,769,624  9/1988  Merritt et al. ............... 310/154
4,787,449  5/1986  West ........................... 310/154

OTHER PUBLICATIONS

"The Magnet and the Motor Shell"-Allen Bradley, Int'l Coil Winders, Oct. '85.
"Standard Specifications for Permanent Magnet Materials" (No. 0100-87), Magnetic Material Producers Association, Apr., '85.
"A Guide to Understanding, Specifying and Using Permanent Magnetic Materials"-Magnetic Material Producers Association, pp. 1-27.
"Arnox Permanent Magnets"-Arnold, PM-133C, p. 11.B.

Primary Examiner—Patrick R. Salce
Assistant Examiner—D. L. Rebsch
Attorney, Agent, or Firm—McAndrews, Held & Malloy, Ltd.

[57] ABSTRACT

A magnet shield having a recessed area for receiving a demagnetized permanent magnet. The magnet and shield are axially inserted between the armature and cylindrical frame of a motor. Locating legs, formed on the end heads between which the cylindrical frame mounts, serve to guide and locate the magnet shield into position. After assembly, the demagnetized magnets are magnetized.

25 Claims, 3 Drawing Sheets

U.S. Patent   Apr. 10, 1990   Sheet 1 of 3   4,916,344
FIG. 1
FIG. 2
FIG. 3
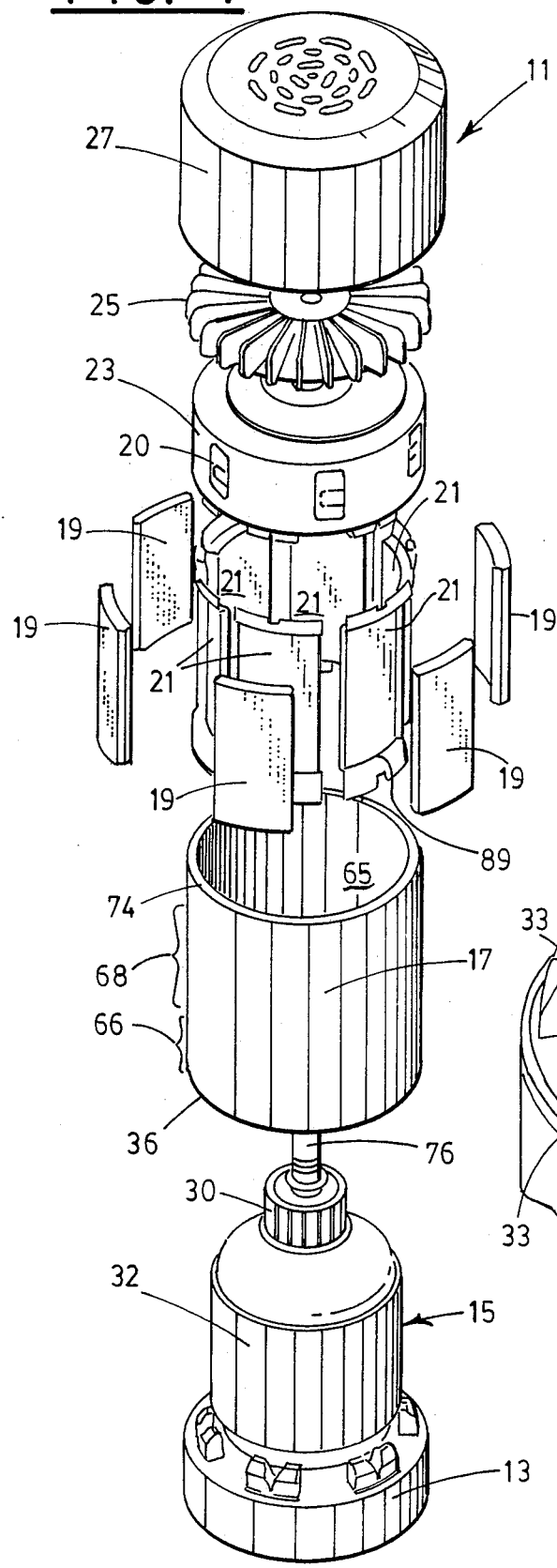
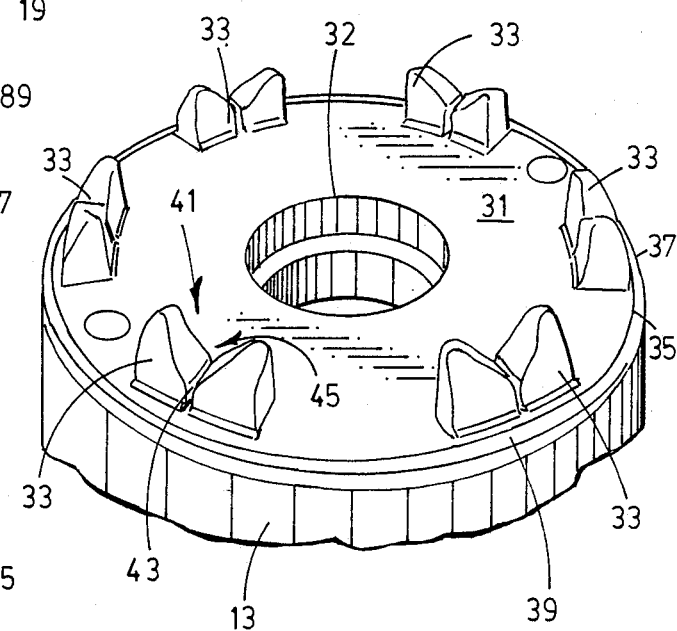

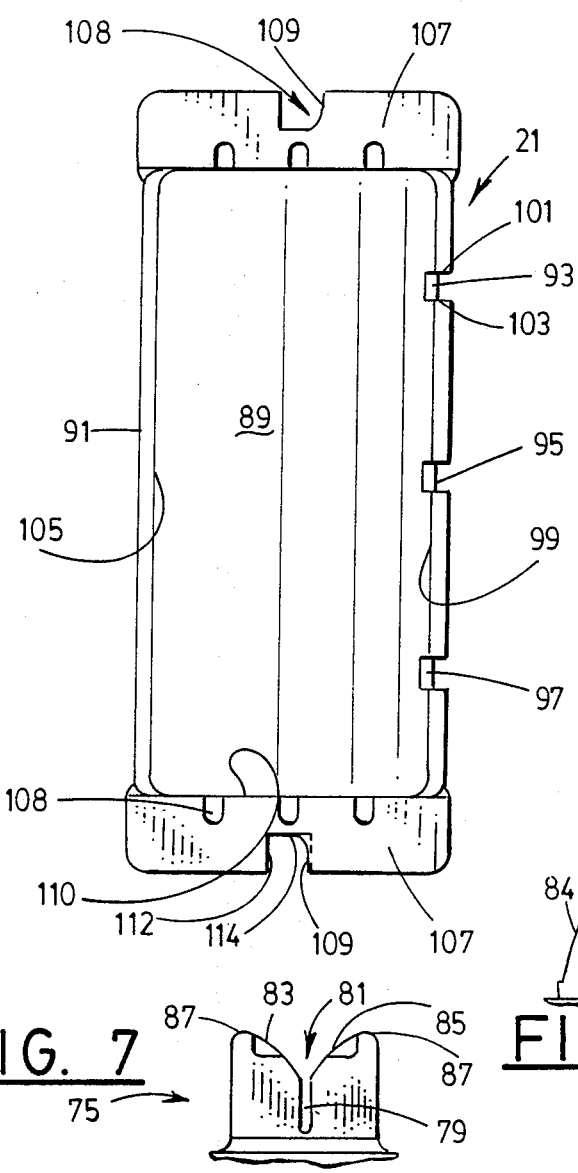
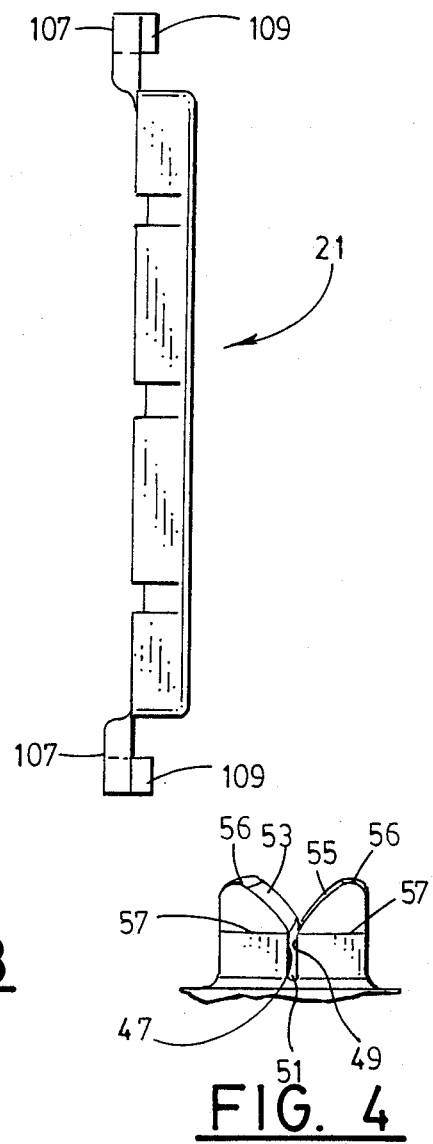
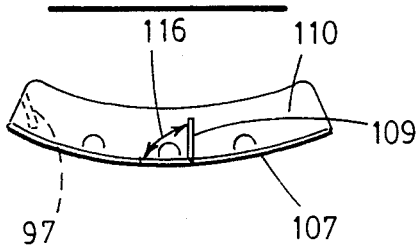
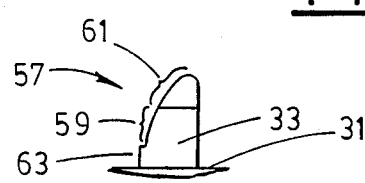

MOTOR MAGNET SHIELD RETENTION ASSEMBLY

BACKGROUND OF THE INVENTION

The invention relates to an improved motor having a magnet retention assembly and more particularly relates to a method of mounting a magnet in a motor frame during assembly of a motor.

Generally, there are two basic methods of mounting a magnet into a motor frame. The first method uses a clip assembly that mechanically fastens the magnet against the cylindrical motor frame by spring pressure. The second method uses various adhesives to secure the magnet against the motor frame.

Clip assemblies used in such an assembly method are especially designed to snap into place and put strong pressure against the arc end of the magnets to hold the magnets against the frame. The clipping operation is a clean and safe production process. It takes a low energy input and as a result is a low cost process.

Although the clipping process lends itself readily to automation, there are some limitations on the process that restrict universal application. The first of these is that clips are restricted generally to a two pole motor construction. The variations in clip pressure make four pole designs impractical. Secondly, the clips provide a limited holding force when compared to magnets which are bonded to the motor frame. Thirdly, the clip field assembly has limited impact resistance due to the limiting holding force of the clips. Finally, clipping requires tighter magnet dimensional tolerencing. Because of these limitations, clips are generally restricted to motor diameters of three inches or less.

The method of adhering magnets to the motor frame makes use of various types of adhesives Generally, the method involves a manual scrubbing operation to thoroughly clean the frame and a manual application of the activator and resin used to bond the magnets to the frame. A good adhesive bond depends on the quantity, degree of surface coverage and the age of adhesive and resin. This process of bonding must be closely monitored to obtain a consistent bond. Also, during assembly the bonding material must be applied to the motor frame and/or the magnet and special fixturing may be required to hold the magnet in place while the bonding material cures. Close production control over cure schedule and joint surface preparation is necessary in order to achieve an adhesive bond of optimum properties.

SUMMARY OF THE INVENTION

Because of these various limitations, it is an object of the present invention to develop a method of retaining magnets within a motor without the application of adhesive and without the need for clipping the arc end of the magnets to hold the magnets against the cylindrical motor frame.

It is yet another object of the present invention to provide a motor in which magnets may be quickly and easily placed into position.

These and other objects of the invention are achieved in a motor having a pair of end head assemblies, an armature and a frame. A magnet shield is utilized for receiving and mounting of a magnet with respect to the frame for holding the magnet into position. The magnet shield includes a pair of locking tabs, one tab on each end of the shield for lockingly engaging first and second locating legs disposed on the end head assemblies.

DESCRIPTION OF THE DRAWINGS

FIG. 1 is an exploded perspective view of the motor embodiment of the present invention.

FIG. 2 is an assembled perspective view of the motor of FIG. 1.

FIG. 3 is a top perspective view of the drive end head of the motor of FIG. 1.

FIG. 4 is a perspective view of a locator leg of the end head of FIG. 3.

FIG. 5 is a side view of the locator leg of FIG. 4.

FIG. 7 is a front view of a locator leg of the commutator end head of FIG. 6.

FIG. 8 is a side view of the locator leg of FIG. 7.

FIG. 9 is a front view of the magnet shield of the motor of FIG. 1.

FIG. 10 is a side view of the shield of FIG. 9.

FIG. 11 is an end view of the shield of FIG. 9.

DETAILED DESCRIPTION OF THE PREFERRED EMBODIMENT

Figure 6:
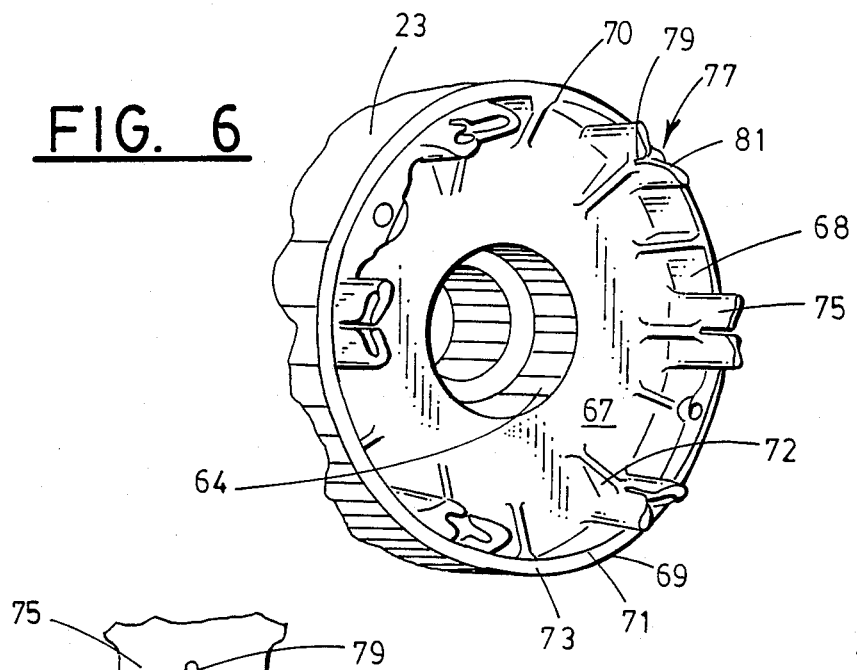
FIG. 6 is a perspective partial view of the commutator end head of the motor of FIG. 1.

Referring to FIG. 1, a six pole motor 11 is assembled from a drive end head 13, an armature or armature assembly 15, a frame 17, six permanent magnets 19, six magnet shields 21, a commutator end head 23, a fan blade 25 and a shroud 27. All of these components are assembled together to form a compact motor 11 as shown in FIG. 2. End heads 13,23 include bearing assemblies (not shown) which receive armature 15 in a conventional fashion for permitting rotation thereof to drive an output shaft 29 (FIG. 2).

Armature 15 is a conventional armature having a commutator portion 30 and a coil area portion 32. Brushes (not shown) are held in commutator end head 23 and make sliding electrical engagement with commutator portion 30 of the armature. Coil area 32 may include conventional insulators between which the motor coils are wrapped and presents a generally cylindrical outer face which rotates past permanent magnets 19.

As shown in FIG. 3, drive end head 13 is die cast from metal and is generally cylindrical in shape having a top flat platform surface 31. A central opening 32 is formed in platform surface 31 for receiving armature 15. A conventional bearing (not shown) is disposed in opening 32 to permit ease of rotation of the armature.

Six separate locating legs 33 are stationed at equally spaced points around a circular perimeter 35 on platform surface 31. Perimeter 35 is spaced radially inward from an outer perimeter 37 of the cylindrical end head 13. This provides a radial area 39 disposed between perimeter 35 and outer perimeter 37 of the end head. Radial area 39 supports the end 36 (FIG. 1) of frame 17 after the frame is slid over armature 15 during assembly of the motor.

Each locating leg 33 includes a slot or notch 41 formed of a narrow vertical slot 43 extending into a flared slot 45. As shown in FIGS. 3 and 4, vertical slot 43 is formed of three walls: a first side wall 47 disposed substantially normal to the platform surface; a second side wall 49 disposed substantially normal to the platform surface such that slot 43 is generally radially disposed with respect to circular platform surface 31; and a bottom wall 51 which is spaced above and parallel to platform surface 31.

Flared slot 45 (FIG. 3) is formed from a pair of beveled surfaces 53, 55 which intersect the first and second side walls 47,49, respectively, of vertical slot 43. The inclined or beveled surfaces 53,55 depend from top most points 56 of leg 33 into vertical slot 43.

Referring to FIG. 5, each locating leg 33 provides a radial confronting guide surface 57 formed on each side of slot 41. As shown in FIG. 5, guide surface 57 includes a normal surface 59 and a radial curved surface 61 to provide a cam or guide surface 57. Surface 59 is a curved surface disposed normal to circular platform surface 31 and surface 61 extends upwardly from normal surface 59 in a radially decreasing curve, as shown.

As shown in FIG. 5, locating leg 33 also includes an alignment surface 63 which is curved and follows the general circumference of perimeter 35. Surface 63 is normal to platform surface 31 and is spaced radially outward from normal surface 59.

During motor assembly, frame member 17 is slid over armature 15 (as shown in FIG. 1) and alignment surface 63 of each locating leg 33 (FIG. 5) serves to position and align cylindrical frame 17 onto radial area 39 (FIG. 3). As the inside surface 65 of frame 13 meets with the radial confronting guide surface 57 of any locating leg, the surface 57 guides the frame downward over alignment surface 63. The six locating legs 33 serve to position frame 17 onto end head 13 as the frame is lowered over armature assembly 15.

As shown in FIG. 1, frame 17 has a lower portion 66 which is cylindrical in shape for providing an inside surface 65 in the area of portion 66 for meeting with guide surfaces 57 and alignment surfaces 63 as required to align frame 17 onto end head 13. Frame 17 includes a middle portion 68 which is also cylindrical in shape providing an inside surface 65 in the area of middle portion 68 for cooperating with magnet shields 21 to retain magnets 19 relative to frame 17. In the preferred embodiment, the entire frame 17 is formed of a hollow cylinder of metal.

Referring to FIGS. 6, 7, and 8, commutator end head 23 is molded from an insulating plastic material and is generally cylindrical in shape having a bottom flat surface 67. A central opening 64 receives a metal bearing assembly (not shown) for rotatably receiving armature 15. End head 23 serves as a yoke for housing six stationary brush holders 20 (FIG. 1) which are described in more detail in U.S. patent application Ser. No. 284,312, filed Dec. 14, 1988, which is incorporated herein by reference.

An outer circular ridge 68 extends downwardly from bottom surface 67 and is supported by several angular supports 70. Ridge 68 is bound by an outer circular perimeter 69 and an inner perimeter 71 between which lies a radial area 73. Radial area 73 rests on the other end 74 (FIG. 1) of frame 17 as end head 23 is slid onto shaft end 76 of the armature assembly Commutator end head 23 includes six locating legs 75 also supported by several angular supports 72. Each locating leg 75 includes a notch or slot 77 formed of a narrow vertical slot 79 extending into a flared slot 81. Flared slot 81 is formed from a pair of inclined or beveled guide surfaces 83,85 (FIG. 7) which depend from the top most ends 87 of locating leg 75 inwardly toward the vertical slot 79. Slot 79 is centrally located in the locating leg 75.

Each of the six locating legs 75 are positioned along the inner perimeter 71 of end head 23 in an equally spaced manner as shown in FIG. 6. Locating legs 75 are spaced at a radial distance from the center of end head 23 for vertical alignment with the locating legs 33 disposed on end head 13.

Referring again to FIG. 1, each magnet shield 21 holds a magnet 19 within a recessed area 89 formed in the shield. The six magnet shields and their corresponding magnets are positioned around the coil area 32 of armature 15 in an equally spaced manner. Locating legs 33,75 serve to locate magnet shields 21 relative to armature 15 and frame 17.

Motor 11 is assembled beginning with armature 15 and drive end head 13. Armature 15 is positioned onto end head 13 within a bearing (not shown) which permits rotation of the armature relative to end head 13. Next, frame member 17 is slid over armature 15 and located onto the radial area 39 (FIG. 3). Alignment edge 63 (FIG. 5) serves to position the drive end head 13 atop platform surface 31.

Each magnet 19 is placed into a corresponding recessed area 89 in an associated magnet shield 21. The magnet and shield assembly is then axially inserted and slid between armature 15 and cylindrical frame 17. The locating legs 33 of the drive end head 13 serves to locate the shield and magnet assembly as the same is slid between armature 15 and frame 17.

Referring to FIGS. 9,10, and 11, each magnet shield 21 is stamped from a single piece of metal, generally indicated by reference Numeral 91. Shields 21 may be made of plastic, aluminum, stainless steel, etc., but preferably stainless steel. Stainless steel may be formed more easily than aluminum and the eddy current losses due to the stainless steel are negligible.

Recessed area 89 is centrally located in shield 21 and is of a size to receive a magnet 19. As will suggest itself, the arc or length of shield 21 can be established in accordance with the dimensions of armature 15 and frame 17.

A plurality of locating tabs 93,95,97, are cut from the metal 91 along one vertical wall 99 of the recessed area 89. Each locating tab 93,95,97 is cut from two slits 101, 103, (FIG. 9) and bent into the recess area (FIG. 11) and serve to positively locate a magnet 19 against the opposite vertical wall 105 of recessed area 89. This prevents the magnet from moving in the motor when power to the motor is reversed.

Each of the two ends of shield 21 are formed into retaining lip 107 and a locating tab 109. Retaining lip 107 is a curved thin piece of metal, as shown in FIG. 11, for contacting curved surface 59 of leg 33 (FIG. 5) and curved surface 84 of leg 75 (FIG. 8).

Locating tab 109 is cut from each end of magnet shield 21. A pair of cuts 112,114 (FIG. 9) are made in the metal 91 which forms retaining lips 107, and tab 109 is bent inwardly as shown in FIG. 11. Angle 116 of the bend of tab 109 may be less than 90°. A radius of curvature, as shown at 108, permits a wider dimension in slots 43,79 in legs 33,75; the curvature takes up the mechanical clearance.

This structure of tab 109 serves to prevent the magnet and shield assembly from moving in the motor when power to the motor is reversed. Additionally, the locating tab 109 may be offset a given angle from center in order to incorporate an effective brush shift. To improve commutation on a motor, the brushes are shifted against rotation. The magnet shield can be oriented axially to provide the correct shift for either direction of rotation.

Figure 12:
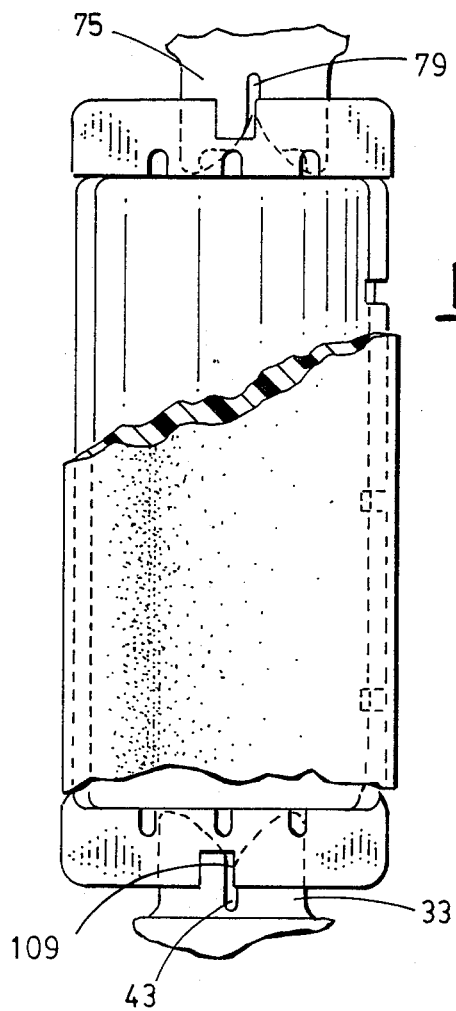
FIG. 12 is a partial front view of the magnet shield in position as located by the locator legs of FIGS. 4 and 7.
Figure 13:
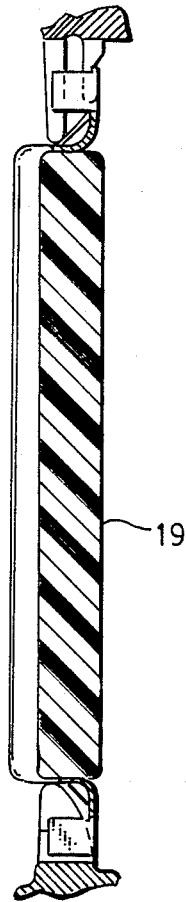
FIG. 13 is a cross-sectional side view of the magnet shield in position as shown in FIG. 12.

As shown in FIGS. 12 and 13, locating tab 109 of the magnet shield is received by vertical slot 43 of a locating leg 33 and by vertical slot 79 of locating leg 75. Legs 33,75 serve to locate the magnet and shield assemblies into their proper position relative to armature 15 and frame 17.

Retaining lips 107 serve as an elongated anchor which is positioned between the locating leg 33 and frame 17 as locating tab 109 is moved into the vertical slot 43 of locating leg 33. Similarly, the top retaining lip 107 is anchored between the locating leg 75 and frame 17 as locating tab 109 is moved into the vertical slot 79 of locating leg 75.

As shown in FIG. 9, three indentations 108 are formed in each retaining lip 107. The indentations form an angular support between the end wall 110 of recessed area 89 and the retaining lip 107.

During assembly and after the magnet and the shield assemblies are positioned on end head 13, the commutator end head 23 is positioned onto the top of armature 15. Guide surfaces 83,85 (FIG. 7) of the locating legs 75 serve to guide the respective locating tab 109 into the vertical slot 79 of locating leg 75. Shield 21 begins to locate and then the guide surfaces on the locating legs will guide and assert a force on the retain lip of the shield. The retaining lip of shield serves as a spring to exert a radial force on the shield. This ensures that the magnet shield 21 and magnet 19 are pulled toward the frame 17 and away from armature 15. The shields serve an additional function if ceramic magnets are used. Because ceramic magnets are made of brittle materials that are susceptible of fractures, cracking and chipping, the shields serve to prevent magnet chips from damaging other parts of the motor, as for example, the commutator surface.

After the commutator end head has been seated onto frame 17, the remaining hardware is assembled, such as brush strap connectors (not shown), screw bolts (not shown), and brushware indictor assemblies (not shown).

Preferably, magnets 19 are demagnetized permanent magnets. After assembly of the motor, the magnets are magnetized with an external magnetizing fixture in a conventional manner.

While only a single, preferred embodiment of the invention has been described hereinabove, those skilled in the art will recognize that that embodiment may be modified and altered without departing from the central spirit and scope of the invention. Thus the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

What is claimed is:

1. A motor comprising
   a drive end head having an armature bearing;
   a commutator end head having an armature bearing;
   an armature rotatably mounted in said bearings and between said end heads, said armature having a coil area;
   a frame disposed between said end heads and having a cylindrical portion surrounding the coil area of said armature;
   a plurality of magnets disposed between said cylindrical portion of said frame and said coil area of said armature, said magnets being equally spaced around the perimeter of said armature;
   a plurality of first locating legs secured in fixed relationship with respect to said drive end head;
   a plurality of second locating legs secured in a fixed relationship with respect to said commutator end head;
   a plurality of magnet shields, each one of said shields for receiving one of said magnets and for retaining said one magnet in a relatively fixed relationship with respect to said coil area of said armature, each of said magnet shields having a pair of locating tabs, one of said tabs cooperating with one of said first locating legs and the other of said tabs cooperating with one of said second locating legs for positioning said magnet shield relative to said armature.

2. A motor according to claim 1 wherein said magnet shields are formed from stainless steel.

3. A motor according to claim 1 wherein said first and said second locating tabs have a radius of curvature for permitting a wider dimension of tolerance in cooperation with said first and second locating legs.

4. A motor according to claim 1 wherein a said magnet shield includes means for providing a recessed area for receiving a said magnet, and wherein the inside surface of said cylindrical portion of said frame cooperates with said recessed area to retain the magnet in said recessed area.

5. A motor according to claim 4 and further including clip means for holding a said magnet within said recessed area.

6. A motor according to claim 1 wherein a said magnet shield includes a means for biasing said shield away from said armature.

7. A motor according to claim 6 wherein said biasing means includes a first and second retaining lip; said first retaining lip cooperating with a said first locating leg and said second retaining lip cooperating with a said second locating leg for biasing said magnet shield relative to said armature.

8. A motor according to claim 7 wherein a said retaining lip includes a curved thin piece of metal of uniform thickness.

9. A motor according to claim 8 wherein a said locating tab is formed from a thin piece of the curved metal of uniform thickness which is cut and bent from said metal forming said retaining lip, said locating tab being disposed at a non-normal angle relative to the curved surface of said retaining lip.

10. A motor according to claim 1 wherein said magnet shield and said first and second locating tabs are stamped from a unitary piece of metal.

11. A motor according to claim 7 wherein said magnet shield, said first and second locating tabs and said first and second retaining lips are stamped from a unitary piece of metal.

12. A motor according to claim 4 wherein said recessed area includes a bottom area having a side wall circumscribing said bottom area, said bottom area having a curved surface with a radius of curvature larger than the radius of curvature of the coil area of said armature.

13. A motor according to claim 12 and further including clip means for holding said magnet within said recessed area, said clip means includes a portion of said side wall cut and bent from the material forming said side wall.

14. A motor according to claim 13 wherein said material is metal.

15. A motor according to claim 1 wherein said commutator end head includes a yoke portion and said yoke portion and said locating legs are formed from a plastic material.

16. A motor according to claim 1 wherein said first locating legs include alignment means for aligning said frame relative to said drive end head.

17. A motor according to claim 16 wherein said frame includes second cylindrical portion for abutting said drive end head, and wherein said alignment means includes a first curved surface of radius smaller than the radius of the inside surface of said second cylindrical portion.

18. A motor according to claim 1 wherein said frame is cylindrical in shape.

19. A motor according to claim 17 and wherein said magnet shield includes a retaining lip for biasing said shield away from said armature, said retaining lip having a second curved surface, and wherein said first locating legs include a third curved surface for making contact with said first curved surface, and wherein third curved surface is of a radius smaller than said first curved surface.

20. A motor according to claim 1 wherein each of said first locating legs include means defining a first slot for guiding a said locating tab into a position for positioning a said magnet shield relative to said armature.

21. A motor according to claim 20 wherein said means for defining a first slot includes a radial slot.

22. A motor according to claim 21 wherein said means defining a first slot includes a second slot having flared walls depending into said radial slot.

23. A motor according to claim 1 wherein each of said second locating legs include means defining a first slot for guiding a said locating tab into a position for positioning a said magnet shield relative to said armature.

24. A motor according to claim 23 wherein said means for defining a first slot includes a radial slot.

25. A motor according to claim 24 wherein said means defining a first slot includes, a second slot having flared walls depending into said radial slot.

* * * * *